United States Patent [19]

Turpin et al.

[11] Patent Number: 5,064,270
[45] Date of Patent: Nov. 12, 1991

[54] OPTICAL FIBER SENSOR

[75] Inventors: Marc Turpin, Bures sur Yvette; Jean-Michel Vignolle, Bourg la Reine; Marie-Noël Charasse, Orsay; Jean-Pierre Le Pesant, Gif sur Yvette, all of France

[73] Assignee: Thomson-CSF, Puteaux, France

[21] Appl. No.: 630,294

[22] Filed: Dec. 19, 1990

[30] Foreign Application Priority Data

Dec. 19, 1989 [FR] France ............................ 89 16790

[51] Int. Cl.$^5$ .......................... G02B 6/02; G01B 9/02; G01D 5/34; G01L 1/24
[52] U.S. Cl. .............................. 350/96.29; 350/96.15; 350/370; 356/346; 356/351; 250/227.17; 250/231.19; 73/800
[58] Field of Search ............... 350/96.15, 96.29, 96.30, 350/370, 371, 376; 356/345, 346, 351; 250/227.16, 227.17, 227.18, 227.19, 231.1, 231.19; 73/800

[56] References Cited

U.S. PATENT DOCUMENTS

| 4,173,412 | 11/1979 | Ramsay et al. ................. 250/227.17 |
| 4,556,293 | 12/1985 | Burns et al. |
| 4,642,458 | 2/1987 | Jackson et al. ............. 250/227.17 X |
| 4,659,923 | 4/1987 | Hicks, Jr. ...................... 250/227.11 |
| 4,725,124 | 2/1988 | Taylor ............................. 350/96.29 |
| 4,740,078 | 4/1988 | Daendliker et al. ........ 250/227.17 X |
| 4,761,073 | 8/1988 | Meltz et al. ..................... 250/227.18 |
| 4,830,461 | 5/1989 | Ishiharada et al. ............. 350/96.29 |
| 4,882,716 | 11/1989 | Lefevre et al. ............. 250/227.17 X |
| 4,918,305 | 4/1990 | Wlodarczyk et al. ........ 350/96.29 X |
| 4,943,132 | 7/1990 | Huang ......................... 350/96.15 X |

FOREIGN PATENT DOCUMENTS

| 0144509 | 6/1985 | European Pat. Off. ... 250/227.11 X |
| 0257959 | 3/1988 | European Pat. Off. ...... 350/96.29 X |
| 0326475 | 8/1989 | European Pat. Off. ...... 350/96.29 X |
| 0338902 | 10/1989 | European Pat. Off. ...... 350/96.29 X |
| 2618549 | 1/1989 | France .......................... 350/96.29 X |
| 2189880 | 11/1987 | United Kingdom ......... 350/96.29 X |

Primary Examiner—Brian Healy
Attorney, Agent, or Firm—Oblon, Spivak, McClelland, Maier & Neustadt

[57] ABSTRACT

The disclosed optical fiber sensor uses the effect of variation in the birefringence in a birefringent optical fiber as a function of the stresses and of the temperature. It has a linearly polarized, wide-spectrum source coupled to a polarizing-preserving single-mode optical fiber, along one of its neutral axes, devices capable of inducing coupling points being distributed along this fiber. A polarizer at 45° with respect to the neutral axes of the fiber is placed at output of this sensor fiber. The output radiation is analyzed by spectroscopy, for example in a scanning Michelson interferometer associated with a detector. The detection by the interferometer enables the identification of the devices that are subjected to stresses. The same type of device may be used for the simultaneous detection of the stresses and/or the temperatures. The disclosed device can be applied notably to the monitoring and supervision of any installation in which strains have to be detected.

12 Claims, 4 Drawing Sheets

OPTICAL FIBER SENSOR

BACKGROUND OF THE INVENTION

The invention relates to an optical fiber sensor, notably a strain sensor using optical fibers and their property of intrinsic birefringence. More particularly, it relates to a mechanical strain sensor and a thermal detector. A birefringent optical fiber may be used in two main ways:

to maintain or preserve a given state of polarization (the propagation of the wave along a characteristic axis);

as a polarimeter (differential propagation along both axes of polarization).

The system of the invention applies to these modes of use.

SUMMARY OF THE INVENTION

According to the invention, there is provided an optical fiber sensor comprising:

a linearly polarized wideband optical source, of the superluminescent diode type for example, which may be pulse modulated;

a single-mode birefringent optical fiber sensor, the input face of which is coupled to the source, the axis of polarization of the source being aligned with a neutral axis of the fiber;

at least one device, for creating polarization coupling points, that is placed on the optical fiber and, in being subjected to a stress, creates a coupling point in the fiber;

polarization means that are coupled to the output face of the fiber to align the polarizations of the waves transmitted by the fiber (and to make their interference possible), a spectroscopic analysis device coupled to the output of the polarization means, to analyze the radiation transmitted and to form the transmission function of the sensor, and processing means which, through the transmission function, extract the measurement of strain corresponding to the coupling point.

BRIEF DESCRIPTION OF THE DRAWINGS

The invention will be understood more clearly and other characteristics will appear from the following description and from the appended figures. Of these figures.

DETAILED DESCRIPTION OF THE INVENTION

A polarization-preserving birefringent fiber has two orthogonal polarization axes corresponding to the characteristic modes of the fiber. When a coupling point is created on the fiber, a fraction of the energy is transferred from one axis to the other one. From the coupling point onwards, the optical fiber behaves like a polarimeter. A phase shift between the two orthogonal polarization waves is then accumulated along the path of the light. This phase shift is proportional to the birefringence of the fiber.

An $10^{-3}$ energy coupling is detectable in view of

An 10 energy coupling is detectable in view of the fact that the visibility of a system of interference fringes is a function of the amplification of the waves. There is thus a gain in sensitivity since in amplitude, the ratio is $10^{-3}$, that is $3.10^{-2}$.

This effect is, therefore, extremely perceptible and may be measured in an interferometrical assembly.

Figure 1:
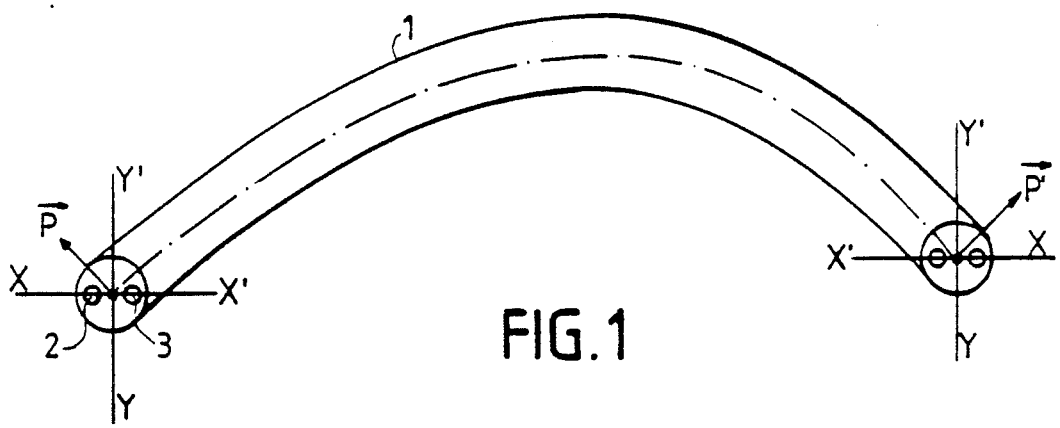
FIG. 1 is a drawing illustrating the working of a birefringent optical fiber as an interferometer.

FIG. 1 shows polarization-preserving single-mode optical fiber 1 for which the birefringence is obtained by means of two highly doped stress "bars" 2, 3 which determine the directions of the two neutral axes XX' and YY' of the fiber. When a fiber such as this receives a radiation polarized along a direction P at an angle of 45° with respect to the neutral axes of the fiber, which therefore gets divided equally between a slow mode and a fast mode corresponding to the two neutral axes, the two waves get propagated at different speeds owing to the birefringence. At output of the fiber, the two modes may be recombined by means of a polarizer at 45° with respect to the two neutral axes, along P.

In an assembly such as this, as in a standard interferometer with two distinct paths, the output power of the radiation varies as a function of the cosine of the phase shift between the two modes.

Figure 2:
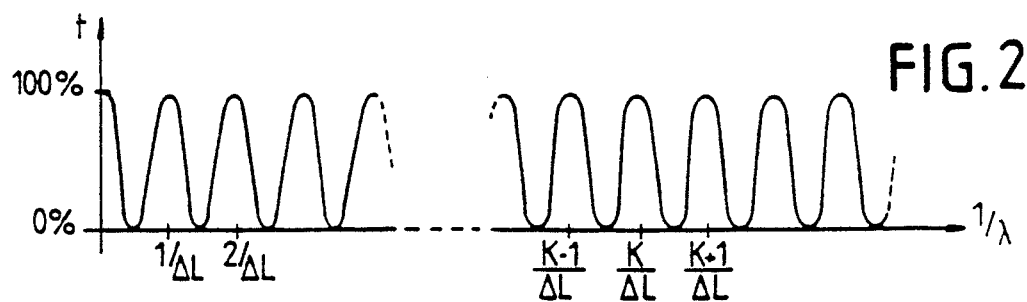
FIG. 2 represents the relationship of transmission, as a function of the inverse of the wavelength, of such an interferometer.

This system also has chromatic filtering properties. For, if there were no dispersion, the birefringence would creat a difference in optical path $\Delta 1$ between the two characteristic modes: the light is transmitted if $\Delta 1 = K\lambda$ and extinguished if $\Delta 1 = (2k+1)\lambda/2$, where $\lambda$ is the wavelength of the optical radiation. The corresponding relationship of transmission as a function of $1/\lambda$ is shown in FIG. 2.

When the birefringence varies, the relationship of transmission gets shifted. If the system is analyzed with a monochromatic line with a wavelength $\lambda_0$, the result obtained is one wherein, by varying the birefringence, the transmission at a given wavelength $\lambda_0$ varies according to a sinusoidal relationship.

Figure 3:
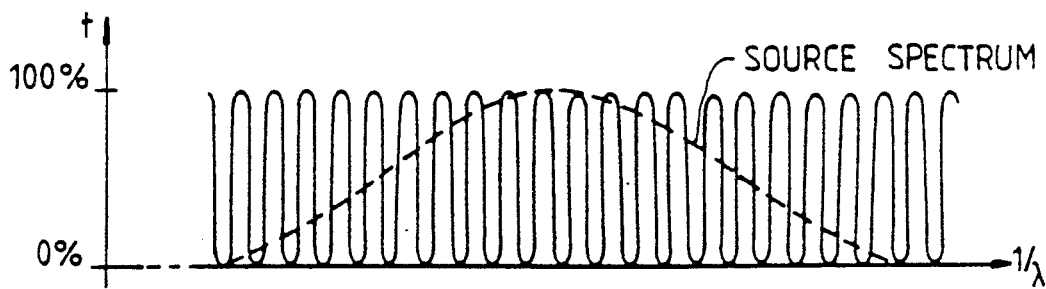
FIG. 3 shows the spectrum of a wide source and the relationship of transmission, as a function of the inverse of the wavelength, of the interferometer.

If, instead of a monochromatic source, the source is a wide-spectrum one, the undulations of the transmission function will be far more constricted. At the output, therefore, there is obtained the product of the undulating relationship of transmission and the spectrum of the source, i.e. a undulating spectrum which may be analyzed by all the standard methods of spectroscopy, for example the methods using dispersion, grating, spectroscopy by Fourier transform, etc. The spectrum of a wide-band source and the undulating relationship of transmission are shown in FIG. 3, as a function of $1/\lambda$.

Spectroscopy by Fourier transform in particular uses a interferometer for which the difference in step is made to vary. A signal is recovered when the shift between the two arms of the interferometer corresponds to the pitch of the undulations (in the frequency domain), i.e. when this shift compensates for that of the first interferometer, the transmission function of which is analyzed.

From the viewpoint of the analysis, the fact of placing two interferometers with similar pitches amounts to the series-mounting of two filters having identical undulation pitches. A small variation in the phase shift of either of the interferometers shifts the relative position of the undulations: when they are in coincidence, the light passes through, but there is a minimum of transmission when they are in anti-coincidence.

The strain sensor according to the invention uses a linearly polarized, pulse-modulated wide-spectrum source such as this coupled to a birefringent single-mode fiber, along the birefringence axis.

Figure 5:
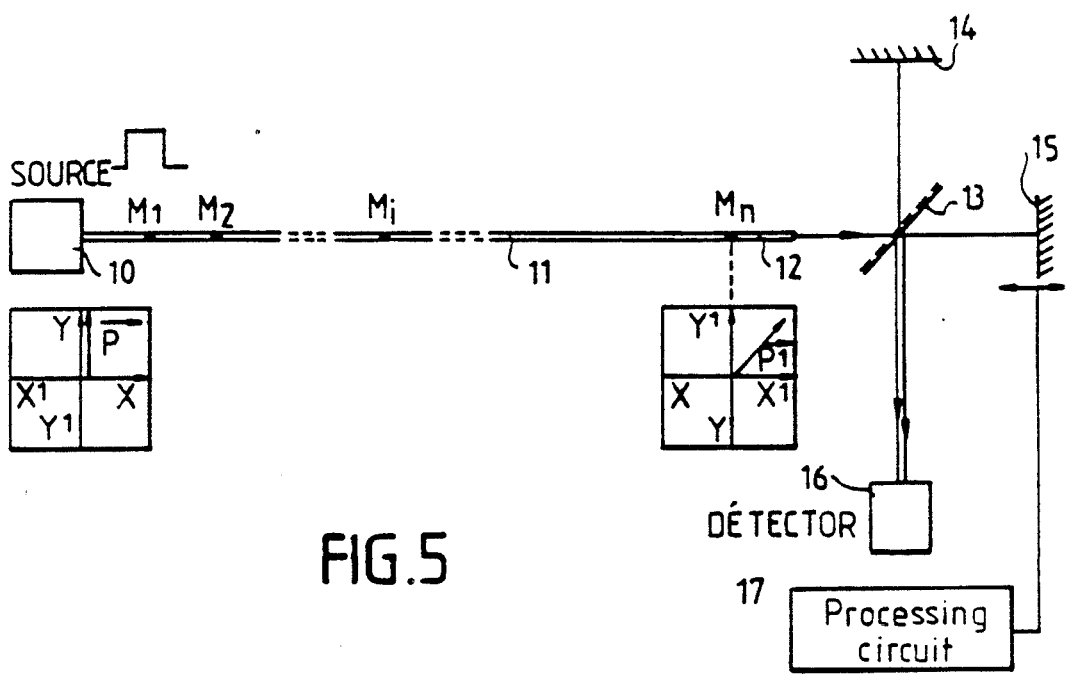
FIG. 5 shows a first embodiment of the sensor according to the invention.

According to the exemplary embodiment of FIG. 5, several devices or transducers M1, M2, . . . Mn are placed on the optical fiber 18, but it must be noted that the system would also work with only one of these devices. These transducers M1, M2, . . . Mn are devices which, when subjected to stresses such as pressure, torsion, bending, tension and shearing stresses, create coupling points in the optical fiber 11.

The transducers M1, M2 . . . Mn are distributed along the fiber at determined measuring points, and their position is therefore known to the system.

If the light enters the fiber in the form of a wave train coupled in the fast mode and if the stresses are applied to one or more transducers, at output of the fiber there will be, firstly, a wave train that has remained in the fast mode and, secondly, one or more wave trains in the slow mode, each resulting from a coupling created by a transducer to which a stress is applied.

Since the transducers that are not subjected to stresses create no coupling point (by design), it is possible to envisage the distribution, on the fiber, of any number of sensors, this number being limited, in practice, by the dimensions of the transducer. The system will work efficiently so long as the number of coupling points that appear is smaller than N, where N depends on the proportion Pi of light capable of being coupled by each active transducer 1. The maximum quantity of light Pmax that can be coupled by each transducer for the effect to be measured is computed as a function of the desired value for N. For example, N is in the order of 1/Pmax.

Figure 4:
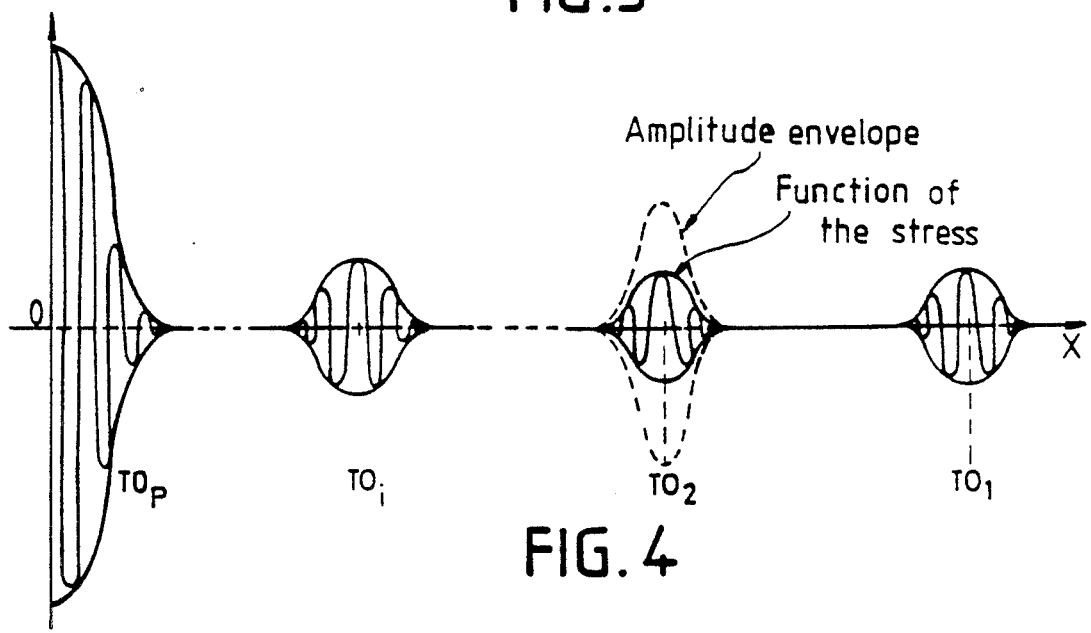
FIG. 4 illustrates the wave trains at output of the polarizer placed at output of a birefringent sensor fiber having several coupling points.

A polarizer at 45° to the neutral axes, placed at output of the fiber, enables the realignment, in the same polarization state, of the main wave train $TO_p$ and the wave trains coupled to the points M1, M2, . . . Mn, namely the wave trains $TO_1$, $TO_2$, . . . $TO_n$ respectively. FIG. 4 shows these wave trains successively detected as a function of the shift x of a scanning interferometer. The shift between the main wave train $TO_p$ and a coupled wave train, namely $TO_1$, is a function of the birefringence between the coupling point M1 and the end of the fiber.

The application of a stress at one of the measurement points M1, M2, . . . Mn leads to the appearance of a system of interference fringes resulting from the main wave train $TO_p$ and a wave train $TO_1$, $TO_2$, . . . $TO_n$.

The order 1 . . . n number of the coupling point is determined as a function of the known phase shift applied to the reading interferometer by definition (principle of compensation) and the amplitude of the stress exerted is proportional to the amplitude of the fringe system.

A method of analysis by spectroscopy, well suited to this example, lies in the use of a scanning Michelson interferometer. This is obviously an example of a reading system and does not constitute the main point of the invention. Another system of interferometrical reading would not modify the nature of the invention.

Figure 7A:
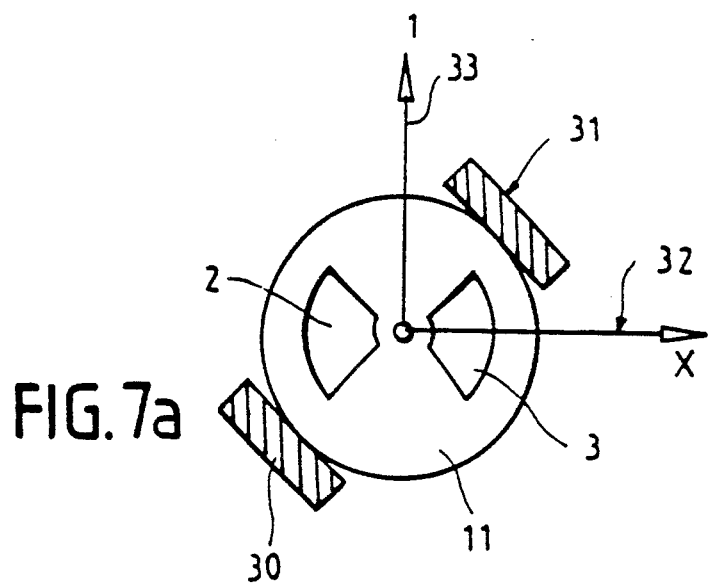
FIGS. 7a and 7b an exemplary embodiment of transducers according to the invention.

A valuable method of setting up transducers that create coupling points consists in placing transducer devices on the optical fiber, where the role of these transducer devices is to convert the mechanical strain into elasto-optical strain at the core of the fiber. As a non-restrictive example, the method uses microjaws positioned at 45° with respect to the planes of symmetry of the fiber to create a localized coupling point. An example of such a transducer is illustrated in FIG. 7a. This figure shows stress bars 2 and 3 located in the fiber 11. These stress bars determine the neutral axes of polarization 32 and 33. Pressure elements 30 and 31 are located in a direction forming a 45° angle with the axes 32 and 33. They are placed on the periphery of the fiber so as to be capable of exerting a pressure on the fiber 11 under the effect of external forces. The geometry and the space occupied by these devices may be reduced to a few cubic millimeters and they may be coated by a material which is the same material or one compatible with the material initially designed to shield the optical fiber (coating, jacket and encapsulation molding).

The shape, nature and position of the parts may differ. It is enough for these parts to induce an energy coupling between the two characteristic modes.

Figure 7B:
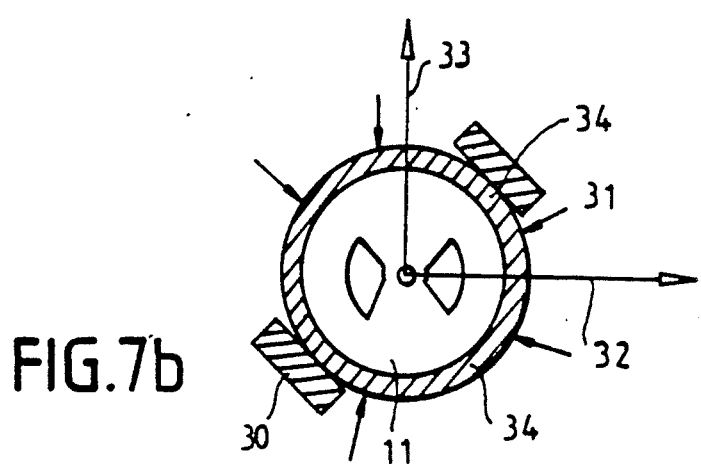

FIG. 7b shows a transducer having a sleeve that surrounds the fiber. The external forces (Fl to Fm) imply stresses transmitted to the fiber by means of the sleeve. The sleeve is made of a material that enables the stresses to be transmitted, or even amplified. The material used may be, for example, epoxy-acrylate or a material with a high Young's modulus.

In FIG. 5, the wide spectrum source 10, of the superluminescent diode type, linearly polarized by design or associated with a polarizer, is coupled, along an axis of birefringence, the fast axis for example, to the birefringent optical fiber 11 which has a certain number of localized weak coupling points $M_1$, $M_2$ . . . $M_i$ . . . A polarizer 12 is coupled to the output of the fiber at an angle of 45° with respect to the neutral axes of this fiber, to align the wave trains. The light coming from this polarizer is then transmitted to a scanning Michelson interferometer comprising a separator element 13 and two onward-reflection mirrors 14 and 15 respectively receiving the waves transmitted and reflected by the separator. One of the mirrors 15 can be shifted along the optical axis of the beam that it receives, and this shift enables the appearance, at the detector, of the maximum values of the transmission function, the spacing of which is related to the wave number of the sensor point where a stress is exerted as indicated here above.

The visibility of the coupling point generated at the $i^{th}$ order device is related to the stress applied to it.

Figure 6:
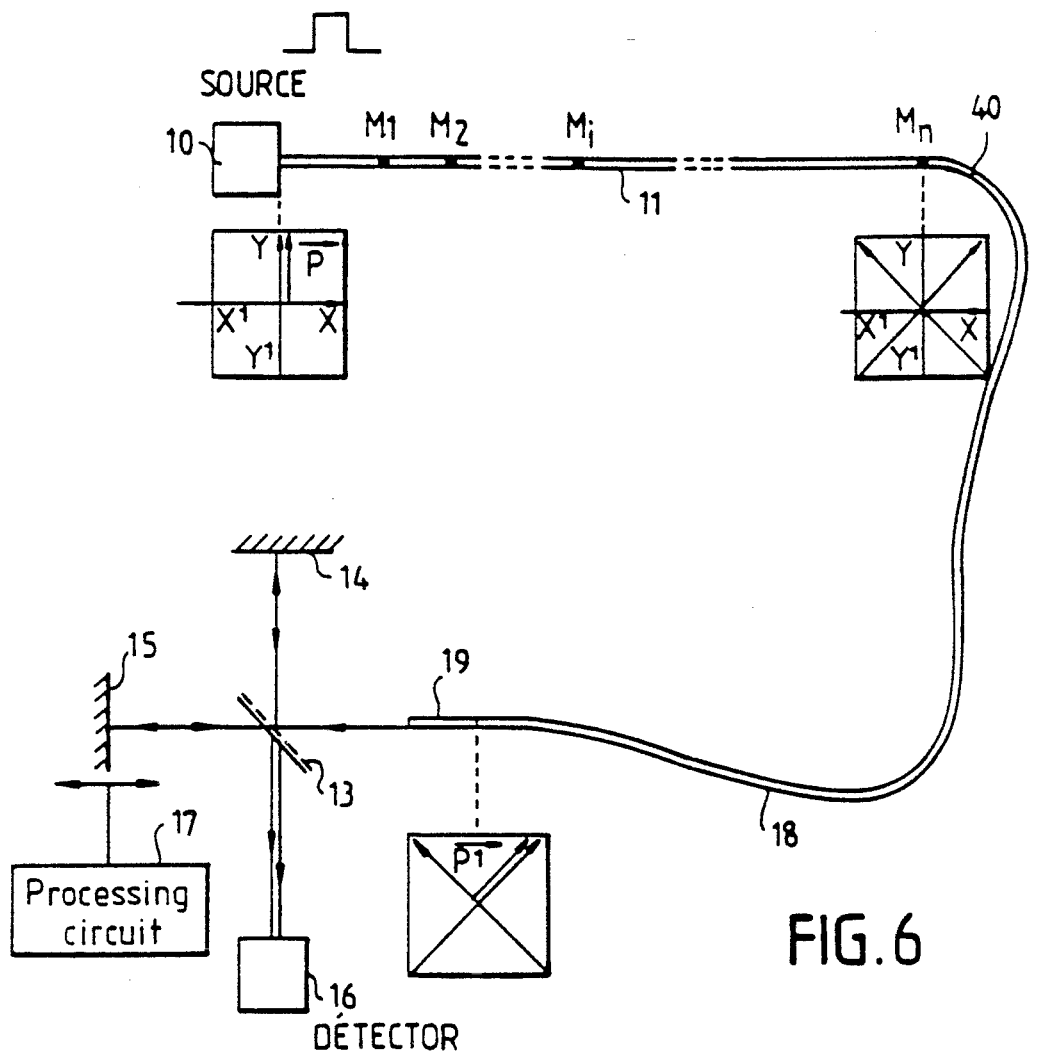
FIG. 6 shows a second embodiment of the sensor according to the invention.

The invention is not restricted to the embodiment described here above. In particular, it may be useful to move the fiber sensor away from the detection and measuring means rather than to place them at output of the sensor fiber. To this end, as shown in FIG. 6 where the same references have been repeated for the same elements, to the face of the output 40 of the sensor fiber 11, there is connected a polarization-preserving fiber 18 with an axis at 45° with respect to the neutral axes of the sensor fiber, and a polarizer 19 is placed at the end of this extension fiber, aligned on the neutral axes of the polarization-preserving fiber, the assembly formed by the fiber 18 and the polarizer 19 being equivalent to the polarizer 12 of FIG. 5. This embodiment enables the fiber sensor part 11 to be offset from the detection and measuring means.

Besides, the wide spectrum source may be either a superluminescent diode, "SLD" as indicated above or a laser source in which the spectrum is widened artificially.

The invention is not restricted to the specifically described embodiments. In particular, the coupling point could be created by other methods inasmuch as they are created at well localized fixed points and inasmuch as they do not destroy the continuity of the core of this fiber.

According to another embodiment of the invention, with the above described sensor, there are combined temperature measurement means as described in the French patent application No. 2626367 as described here above.

A linear polarization preserving single-mode fiber is obtained by creating a high elasto-optical birefringence out of a zone creating intrinsic strains in a single-mode fiber. A standard example of a fiber such as this has the following structure. There are two highly doped bars placed on either side of the core. During the fibre-drawing operation, the different glasses are first of all viscous and then solidify. In cooling down to ambient temperature, the doped bars, which have a thermal expansion coefficient far greater than that of the rest of the structure, contract and therefore place the region of the core under extension stress. By elasto-optical effect, this stress creates birefringence.

This birefringence is often defined by the beat length $L_B$, i.e. the length at the end of which the orthogonal polarizations along the two neutral axes of the fiber are phase shifted by $2\pi$Rad. This length is typically of the order of one to five mm. The above-mentioned stress is therefore caused by the cooling of the inhomogeneous structure and depends on the temperature. This dependence is of the order of $10^{-3}/°$ C.

The optical fiber according to the invention uses this property of variation in the birefringence as a function of the temperature to enable the measurement of temperature.

For the measurement of temperature, controlled coupling points are set up by local twisting of the fiber. It is then enough to heat the fiber locally by means of an electric arc, a torch or a laser source. The twist gets relaxed at the heating point, thus creating a rotation of the neutral axes and, hence, a localized coupling without inducing any losses for all that, since the core of the fiber is not interrupted.

An elementary temperature sensor, then, is the fiber segment separated by two adjacent coupling points.

Figure 8:
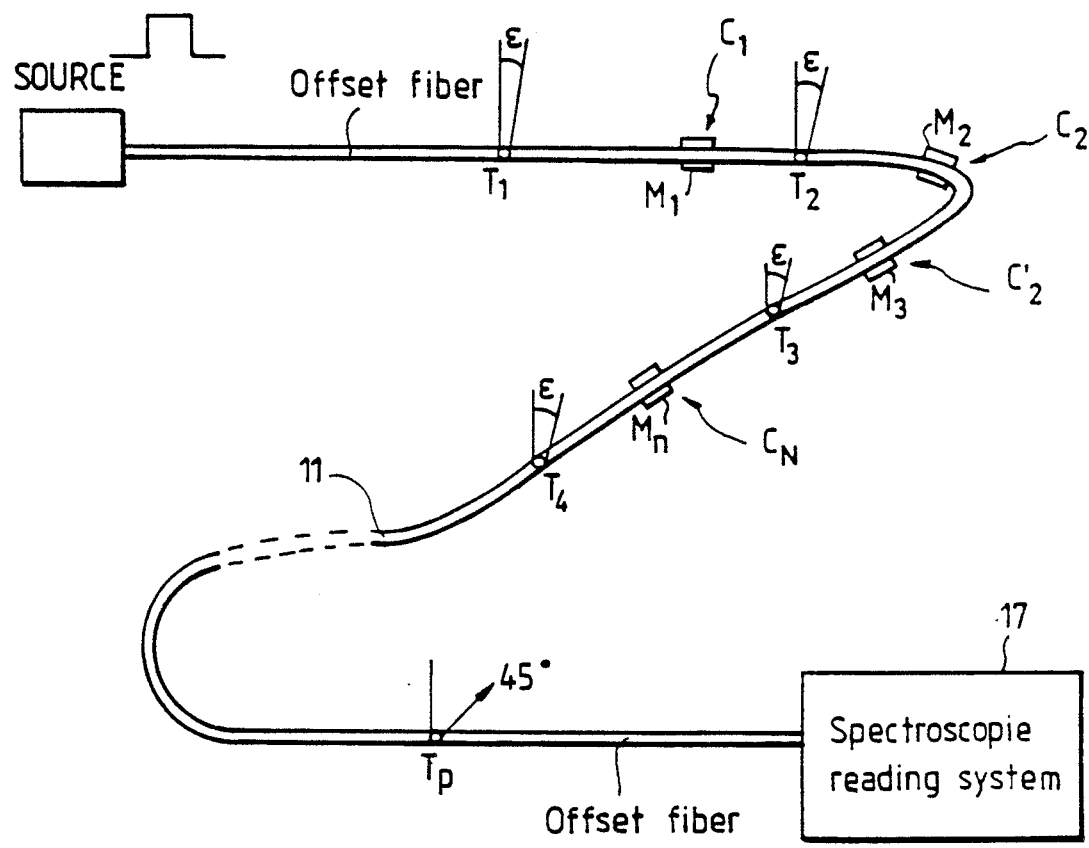
FIG. 8 shows a sensor according to the invention enabling the detection of mechanical strains as well as temperature variations.

FIG. 8 shows a sensor such as this. It has an optical fiber 11 provided with weak coupling points T1 to Tp located at fixed places. A fiber segment between two coupling points such as T1 and T2 therefore determines a temperature sensor.

During operation at a reference temperature, for example at ambient temperature, the detection system 17 (or spectroscopic reading system) receives wave trains such that it detects the coupling points T1 to Tp at the places specified beforehand, as specified by design. When a fiber segment gets heated, the variation of the birefringence leads to an apparent shift in the coupling points which demarcate this fiber segment. This enables the temperature variation to be determined.

The optical fiber 11 is also provided with strain sensors (transducers) M1 to Mn as described earlier. These strain sensors M1 to Mn induce coupling points having fixed positions for the detection system 17, but having variable intensity: this is the contrary of the temperature detection system.

According to the invention, the strain and temperature sensor is then formed by a single optical fiber having, firstly, a series of transducer devices dedicated to the strains to be measured. These devices induce coupling points of variable intensity and have predetermined positions. Secondly, the single optical fiber has a second series of coupling points of "fixed intensity", not subjected to stresses, used to demarcate sections of fibers dedicated to the measurement of the temperature.

The coupling points with "fixed" intensity may be used for calibration to determine the ratio in ampliude (in visibility) between systems of fringes proper to the stresses.

The device according to the invention finds special application in the following fields for supervising and monitoring the behavior of materials or installations having a variety of forces exerted upon them:

industrial structures made of concrete, for example, or of composite materials;

engineering works such as harbours, dams etc.;

aviation, bending of structures.

It is clear that the foregoing description has been given purely by way of an example. The numerical examples and the examples of materials used have been given purely in order to illustrate the description.

What is claimed is:

1. An optical fiber sensor comprising:
    a pulse-modulated, linearly polarized wideband optical source of the superluminescent diode type,
    a single-mode birefringent optical fiber sensor, the input face of which is coupled to the source, the axis of polarization of the source being aligned with a neutral axis of the fiber;
    at least one device, for creating polarization coupling points, that is placed on the optical fiber and, in being subjected to a stress, creates a coupling point in the fiber;
    polarization means that are coupled to the output face of the fiber to align the polarizations of the waves transmitted by the fiber,
    a spectroscopic analysis device coupled to the output of the polarization means, to analyze the radiation transmitted and to form the transmission function of the sensor,
    and processing means which, through the transmission function, extract the measurement of strain corresponding to the coupling point.

2. A sensor according to claim 1, comprising several devices for creating coupling points, the position of each of these devices on the fiber being known by the processing means, these devices creating no coupling point when there is no external stress, thus making it possible to place a greater number of them on the fiber.

3. A sensor according to claim 1, wherein the polarization means are constituted by a fiber polarizer, directly coupled to the sensor fiber with an axis oriented by 45° with respect to the neutral axes of the sensor fiber.

4. A sensor according to claim 1, wherein the polarization means include a polarization-preserving optical fiber coupled to the output face of the sensor fiber, its neutral axes being oriented by 45° with respect to the birefringence axes of the sensor fiber, and an output polarizer coupled to the polarization-preserving fiber, with an axis that is the same as the neutral axis of this fiber.

5. A sensor according to claim 1, wherein the coupling point creating device is capable of exerting a pressure on the fiber along a diameter of the fiber oriented by 45° with respect to the neutral axis of the fiber.

6. A sensor according to claim 4, wherein the device includes jaw capable of clamping on the fiber at two diametrically opposite points.

7. A sensor according to claim 1, wherein the fiber includes a sheath made of a material that transmits, or even amplifies, stress to set up the fraction of the devices for creating coupling points on the fiber.

8. A sensor according to claim 1, comprising a polarizing-preservation fiber coupled in series with the birefringent fiber.

9. A sensor according to claim 1, wherein the optical fiber is also provided with weak coupling points, localized and spaced out along the fiber, and wherein the processing means, on the basis of the transmission function, extract measurements of temperatures of the fiber segments located between the localized weak coupling points.

10. A sensor according to claim 8, wherein the localized coupling points are created on the fiber by elastic torsion then local heating which relaxes the torsion.

11. A sensor according to claim 1, wherein the spectroscopic analysis device is a Michelson interferometer, the onward-reflection mirror of which can be shifted along the optical axis of the radiation that it receives.

12. A sensor according to claim 8, wherein the coupling points are evenly spaced out on the sensor fiber.

* * * * *